(12) United States Patent
Chio

(10) Patent No.: US 8,672,608 B2
(45) Date of Patent: Mar. 18, 2014

(54) TOWER TYPE VERTICAL AXLE WINDMILL

(76) Inventor: Chuy-Nan Chio, Taipei (TW)

(*) Notice: Subject to any disclaimer, the term of this patent is extended or adjusted under 35 U.S.C. 154(b) by 602 days.

(21) Appl. No.: 12/946,825

(22) Filed: Nov. 15, 2010

(65) Prior Publication Data

US 2012/0121379 A1 May 17, 2012

(51) Int. Cl.
*F03D 7/06* (2006.01)

(52) U.S. Cl.
USPC .......................................................... 415/4.2

(58) Field of Classification Search
USPC ............................................... 415/2.1, 4.2, 4.4
See application file for complete search history.

(56) References Cited

U.S. PATENT DOCUMENTS

| | | | | | |
|---|---|---|---|---|---|
| 1,469,064 | A | * | 9/1923 | Zucker | 415/4.4 |
| 4,321,005 | A | * | 3/1982 | Black | 415/4.2 |
| 5,183,386 | A | * | 2/1993 | Feldman et al. | 416/119 |
| 7,866,938 | B2 | * | 1/2011 | Kariya | 415/4.4 |
| 8,232,664 | B2 | * | 7/2012 | Stroup et al. | 290/55 |
| 2005/0074323 | A1 | * | 4/2005 | Chio | 415/4.2 |
| 2006/0275105 | A1 | * | 12/2006 | Roberts et al. | 415/4.2 |
| 2007/0189889 | A1 | * | 8/2007 | Yokoi | 415/4.4 |
| 2008/0267777 | A1 | * | 10/2008 | Lux | 416/132 B |
| 2008/0273975 | A1 | * | 11/2008 | Chio | 416/9 |
| 2013/0039761 | A1 | * | 2/2013 | Dulcetti Filho | 416/3 |

* cited by examiner

*Primary Examiner* — Nathaniel Wiehe
*Assistant Examiner* — Jeffrey A Brownson
(74) *Attorney, Agent, or Firm* — Chun-Ming Shih

(57) ABSTRACT

A tower type vertical axle windmill includes a tower portion. The tower portion has a plurality of layers and a plurality of wind turbines and a computer is used to open and close the walls of the tower portion. Each of the wind turbines includes a seat portion, an energy output assembly and a rudder assembly. The seat portion can carry other components. A circular platform is disposed on the base portion of the energy output assembly and is supported by bearings to enable it to turn around. A flywheel is disposed on the outmost portion of the blade module and can store the energy extracted from the wind and enhance the balance of the windmill. In addition, an output axle is connected with the circular platform and a generator.

18 Claims, 15 Drawing Sheets

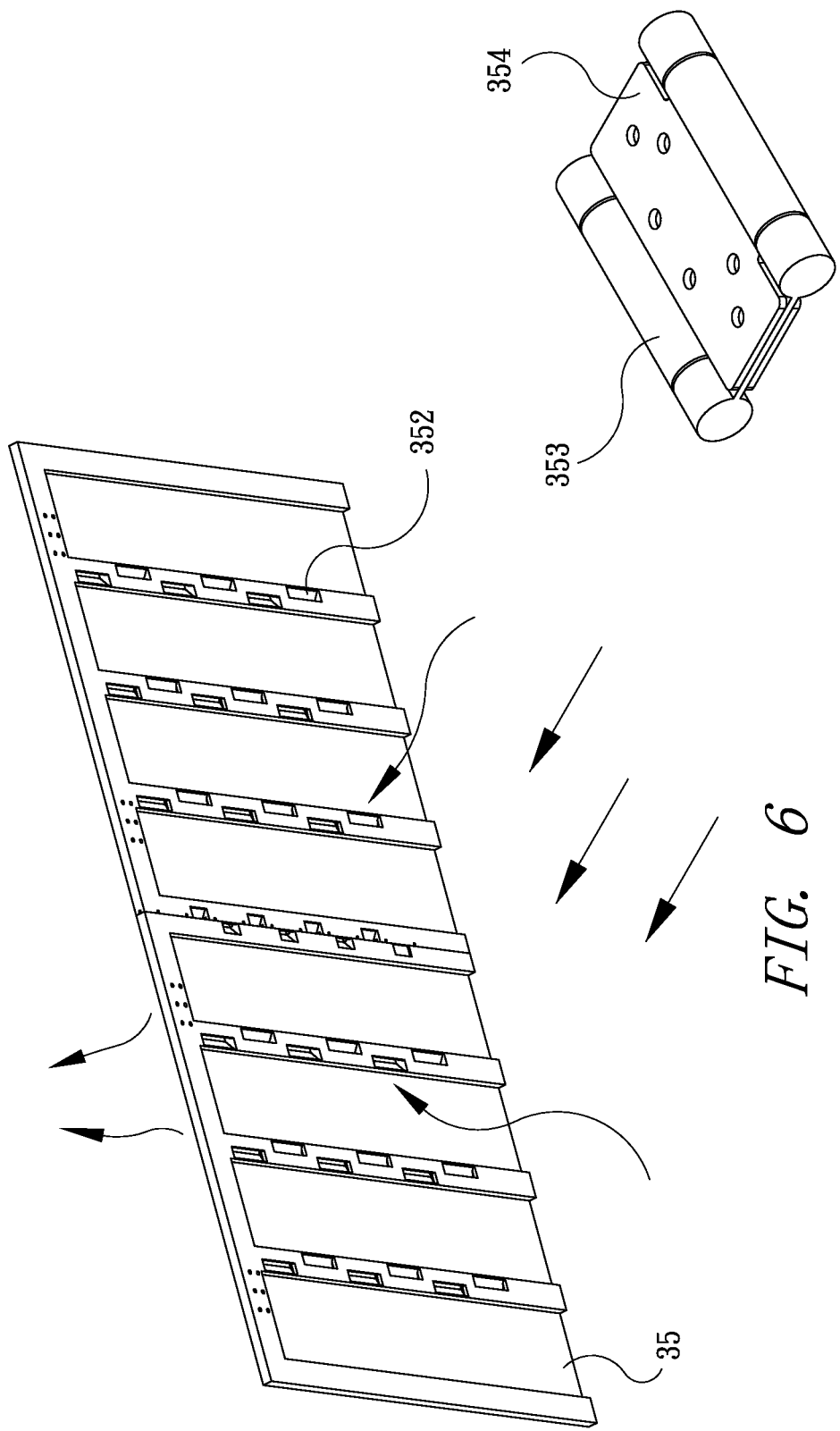

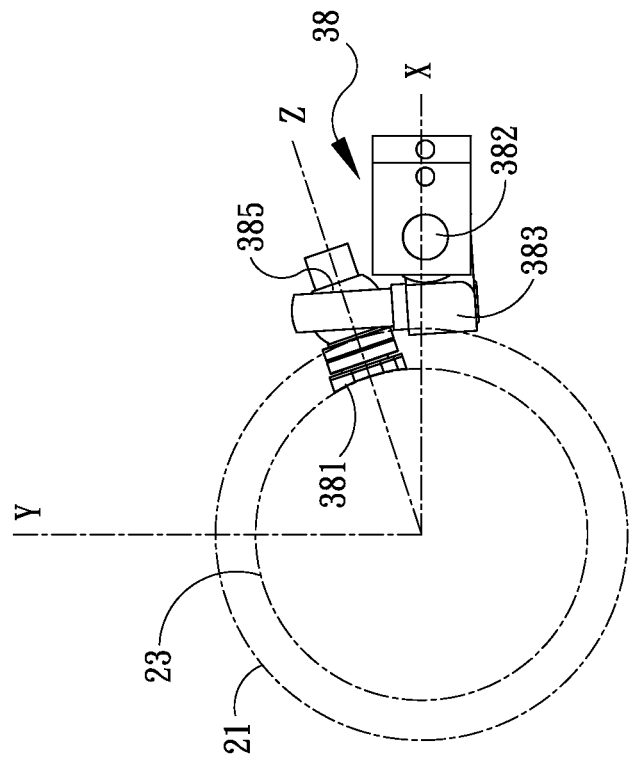
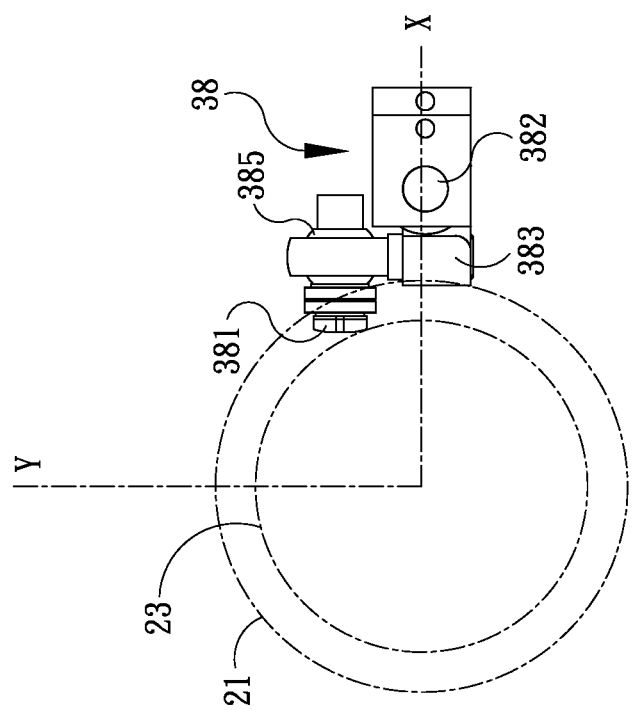

TOWER TYPE VERTICAL AXLE WINDMILL

BACKGROUND OF THE INVENTION

1. Field of the Invention

The invention generally relates to a windmill. More particularly, the invention relates to a tower type vertical axle windmill in which resistance blades (which are constantly perpendicular to the wind direction) and vertical blades are used to rotate an inertia flywheel to extract the energy from the wind. The windmill of the present invention is also called the wind tunnel type vertical axle windmill.

2. Description of the Prior Art

Humans have harnessed the wind power for thousands of years. Usually, blades (propellers) or flyball are used. In addition, a rotation speed enhancing device is also used to increase the rotation speed so as to drive a generator.

Please see FIGS. 11 and 12, which illustrate the traditional windmill. Such windmill has a horizontal or vertical axle and blades or flyball is used to drive the axle of a generator. The air flow cause the blades or flyball to rotate and the rotation may be converted to other mechanical form or be used to generate power.

The axle of the turbine of a horizontal axle windmill is parallel to the ground. Its sails may be adjusted according to the wind direction to extract the maximal amount of wind power. As of now, most of windmills are horizontal axle windmill. The disadvantages of horizontal axle windmill include loud noises and the fact that terrain winds and turbulences are difficult to overcome.

Either horizontal axle windmill or vertical axle windmill has the following disadvantages:

(1) Blades or flyball can harness only a part of the wind energy. The energy conversion efficiency is only 20 to 30% due to turbulences and the fact that blades are not facing against the wind direction.

In addition, the actual energy conversion efficiency is further lowered after the rotational energy is converted into electricity.

(2) A bigger windmill is needed in order to generate more energy. The assembly and disassembly (for the purpose of maintenance) of such bigger windmill is difficult to do and cost is increased too.

(3) When there is strong wind, turbulences would be generated as the blades cut through the strong wind. When there is a super strong wind, the windmill has to stop its operation to avoid the damages of its components.

(4) Generally speaking, the higher the altitude is, the stronger the wind is. Therefore, preferably, windmills are installed at a high altitude. As the traditional windmills are made bigger and bigger, their weight and cost are increased and the difficulty in maintenance becomes greater too.

(5) Turbulences are most difficult to control and can cause serious damages. Most of the damages done on the blades have been caused by turbulences.

As shown in FIG. 13, the blades of a wind turbine have a cross section similar to that of an airfoil. There are two main forces: a lifting force (U), which is perpendicular to the wind direction, and a resistance force (D), which is parallel to the wind direction. Such blade design has better aerodynamic properties.

In U.S. Pat. No. 7,413,404, a sail wing type windmill is disclosed to overcome the aforesaid disadvantages. It is a vertical axle windmill. Sail wings are used to extract energy from the wind. The angle of the sail wings may be adjusted to optimize the energy extraction. Therefore, such windmill has better performance.

As shown in FIG. 14, a negative pressure, F, would form behind the sail wings and such negative pressure works against the rotation of the axle and would adversely affect the performance of the windmill. In addition, in the aspect of orientation control, the cam may move out of the range in the X direction (please see FIGS. 7A and 7B). We can see that the sail wing type windmill has disadvantages and needs to be improved.

From the above, we can see that the windmills of the prior art have many disadvantages and need to be improved. To eliminate the disadvantages in the prior art, the inventor has put a lot of effort into the subject and has successfully come up with the tower type vertical axle windmill of the present invention.

SUMMARY OF THE INVENTION

An object of the present invention is to provide a tower type vertical axle windmill that can control the stability of air flows to obtain stable energy output.

Another object of the present invention is to provide a tower type vertical axle windmill that has a tower portion with a plurality of layers and that each layer is provided with a wind turbine. Also, walls are provided on each layer and a computer is used to open and close the walls according to the wind directions so as to effectively control the air pressure.

A third object of the present invention is to provide a tower type vertical axle windmill in which a plurality of holes are provided in each of the resistance blades to reduce the negative wind pressure on the rear side of each resistance blade to form "flowing water type resistance blades" when the resistance blades are facing in the wind direction so as to enhance the efficiency in the conversion from wind power to mechanical energy.

A fourth object of the present invention is to provide a tower type vertical axle windmill wherein the resistance blades are always perpendicular to the wind direction to stabilize the energy output.

A fifth object of the present invention is to provide a tower type vertical axle windmill wherein the resistance blades and vertical blades are used to drive the inertia flywheel.

A sixth object of the present invention is to provide a tower type vertical axle windmill wherein a flywheel is used so as to increase the stability in energy output and to effective enhance the balance of the windmill thanks to the inertia and centrifugal force generated by the flywheel.

A seventh object of the present invention is to provide a tower type vertical axle windmill wherein all of its components are modular components and each module may be easily and conveniently replaced, and wherein all the modules are made of regular materials and are made by the regular manufacturing methods so as to shorten the manufacturing time and lower the costs in assembly and maintenance and so that they are safe to use and easy to assemble.

To reach these objects, the tower type vertical axle windmill of the present invention is disclosed. The tower type vertical axle windmill of the present invention comprises a tower portion. The tower portion has a plurality of layers and a plurality of wind turbines and a computer is used to open and close the walls of the tower portion. Each of the wind turbines comprises a seat portion, an energy output assembly and a rudder assembly. The seat portion can carry other components.

A circular platform is disposed on the base portion of the energy output assembly and is supported by bearings to enable it to turn around. A sleeve is disposed on the circular platform and may move along with the circular platform. A blade assembly is connected with the sleeve and has an upper connective portion and a lower connective portion. The upper connective portion is fixed on the upper portion of the sleeve and the lower connective portion is fixed on the lower portion of the sleeve. Either connective portion is connected with a plurality of blade modules. Each blade module has a plurality of resistance blades. A rotational axle is disposed on the inner end of the blade module and a camshaft is disposed at the lower end of the rotational axle. Therefore, the cam can move in the X, Y and Z directions to stay within the track guiding portion and can adjust the angle of the resistance blades. A plurality of vertical blades are disposed on the outer side of the resistance blades on the blade module and can prompt the energy output assembly to rotate when there is air flow. A flywheel is disposed on the outmost portion of the blade module and can store the energy extracted from the wind and enhance the balance of the wind turbine. In addition, an output axle is connected with the circular platform and a generator.

The rudder assembly has a rotation guiding tube, which is provided on the circular platform. Bearings are provided between the rotation guiding tube and the circular platform so that the rotation guiding tube can turn around independently. The track guiding portion is disposed on the outer surface of the rotation guiding tube. A rudder seat is disposed on the top portion of the rudder assembly. The rudder seat is terminated into a twin vaned tail wing, which is constantly facing against the wind direction to turn the rotation guiding tube and the blade assembly when the wind direction varies.

These features and advantages of the present invention will be fully understood and appreciated from the following detailed description of the accompanying Drawings.

BRIEF DESCRIPTION OF THE DRAWINGS

FIG. 6 is a perspective view showing one of the resistance blades.

FIG. 7B is a second view showing how the camshaft operates (2).

FIG. 7C is a third view showing how the camshaft operates (3).

FIG. 8 is a perspective view showing one of the hinge units.

DETAILED DESCRIPTION OF THE PREFERRED EMBODIMENT

Figure 1:
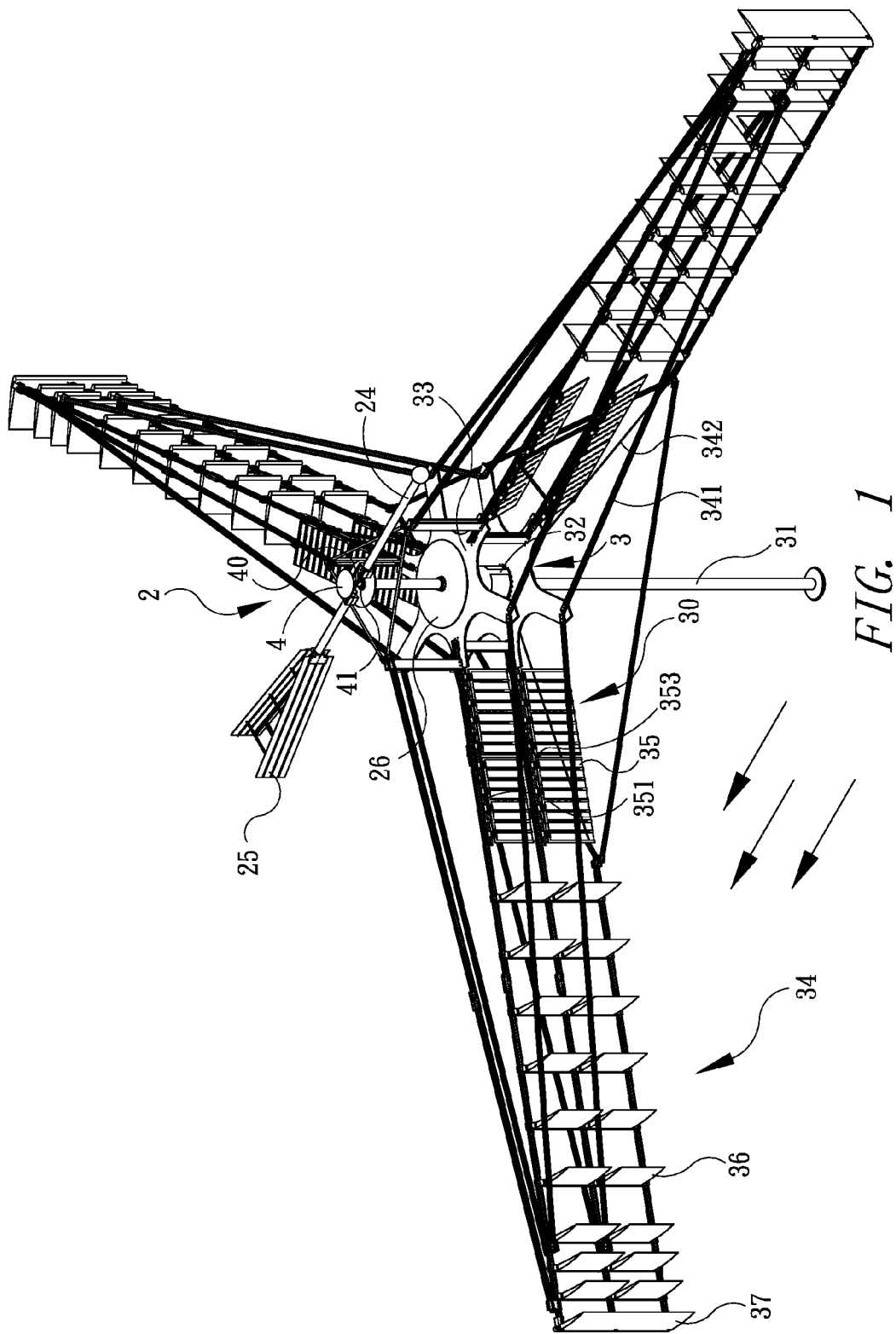
FIG. 1 is a perspective view showing the tower type vertical axle windmill of the present invention.

Please see FIGS. 1 to 5A, which illustrate the tower type vertical axle windmill of the present invention. The windmill of the present invention comprises a tower portion 5. The tower portion has a plurality of layers and a wind turbine is provided in each layer. A computer is used to open and close the walls 51 of the tower portion 5 according to the direction and speed of the wind to avoid the occurrence of turbulences. Holes 52 are provided in each wall 51. When the wind gets too strong, the walls 51 may be closed and some air flow may still be let in through the holes 52 to keep the axle rotating.

Each of the wind turbines comprises a seat portion 1, an energy output assembly 3, a rudder assembly 2 and an antenna and instrument panel portion 4.

The seat portion 1 is fixedly disposed on the tower portion 5 and can carry other components to facilitate the assembly of these components.

Figure 2:
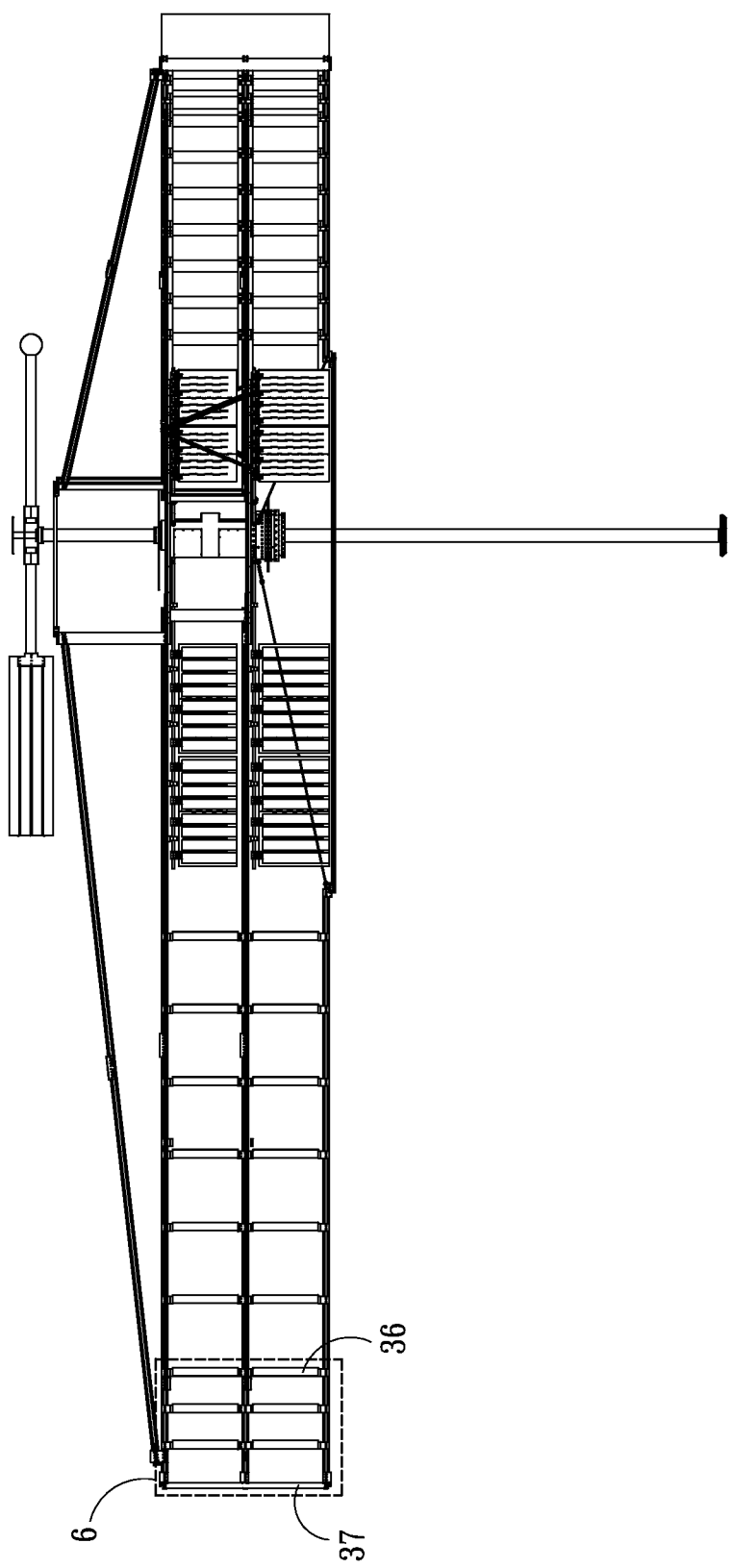
FIG. 2 is a side view showing the tower type vertical axle windmill of the present invention.

A circular platform 39 is disposed on the base portion of the energy output assembly 3 and is supported by bearings to enable it to turn around. A sleeve 32 is disposed on the circular platform 39 and may move along with the circular platform 39. A blade assembly 30 is connected with the sleeve 32 and has an upper connective portion and a lower connective portion 33. The upper connective portion 33 is fixed on the upper portion of the sleeve 32 and the lower connective portion 33 is fixed on the lower portion of the sleeve 32. Either connective portion 33 is connected with a plurality of blade modules 34. Each blade module 34 has a plurality of resistance blades 35. A rotational axle 351 is disposed on the inner end of the blade module and a camshaft 38 is disposed at the lower end of the rotational axle 351. The cam 381 can move in the X, Y and Z directions to stay within the track guiding portion 23 and can adjust the angle of the resistance blades 35. A plurality of vertical blades 36 are disposed on the outer side of the resistance blades 35. The vertical blades 36 may prompt the assembly to rotate when wind blows on the vertical blades 36. A flywheel 6 is disposed on the outmost portion of the blade module 34, as shown in FIG. 2. The flywheel 6 includes several vertical blades 36 on the outmost portion of the blade module 34. The flywheel 6 can store the energy extracted from the wind and enhance the balance of the wind turbine. In addition, an output axle 31 is connected with the circular platform 39 and the output axle 31 is also connected with a generator (not shown in the drawings).

The rudder assembly 2 has a rotation guiding tube 21, which is provided on the circular platform 39. Bearings 22 are provided between the rotation guiding tube 21 and the circular platform 39 so that the rotation guiding tube 21 can turn around independently. The track guiding portion 23 is disposed on the outer surface of the rotation guiding tube 21. A rudder seat 24 is disposed on the top portion of the rudder assembly 2. The rudder seat 24 is terminated into a twin vaned tail wing 25, which is constantly facing against the wind direction to turn the rotation guiding tube 21 and the blade assembly 30 when the wind direction varies.

A tube 40 extends downwards from the antenna and instrument panel portion 4. The tube 40 is centrally located in the seat portion 1, energy output assembly 3 and rudder assembly 2. Bearings are used to separate the tube 40 from the seat portion 1, rudder assembly 2 and output axle 31. Through the tube 40, electric wires may electrically connect the antenna and instrument panel portion 4 or a lightning rod to other components on the ground level.

Figure 3:
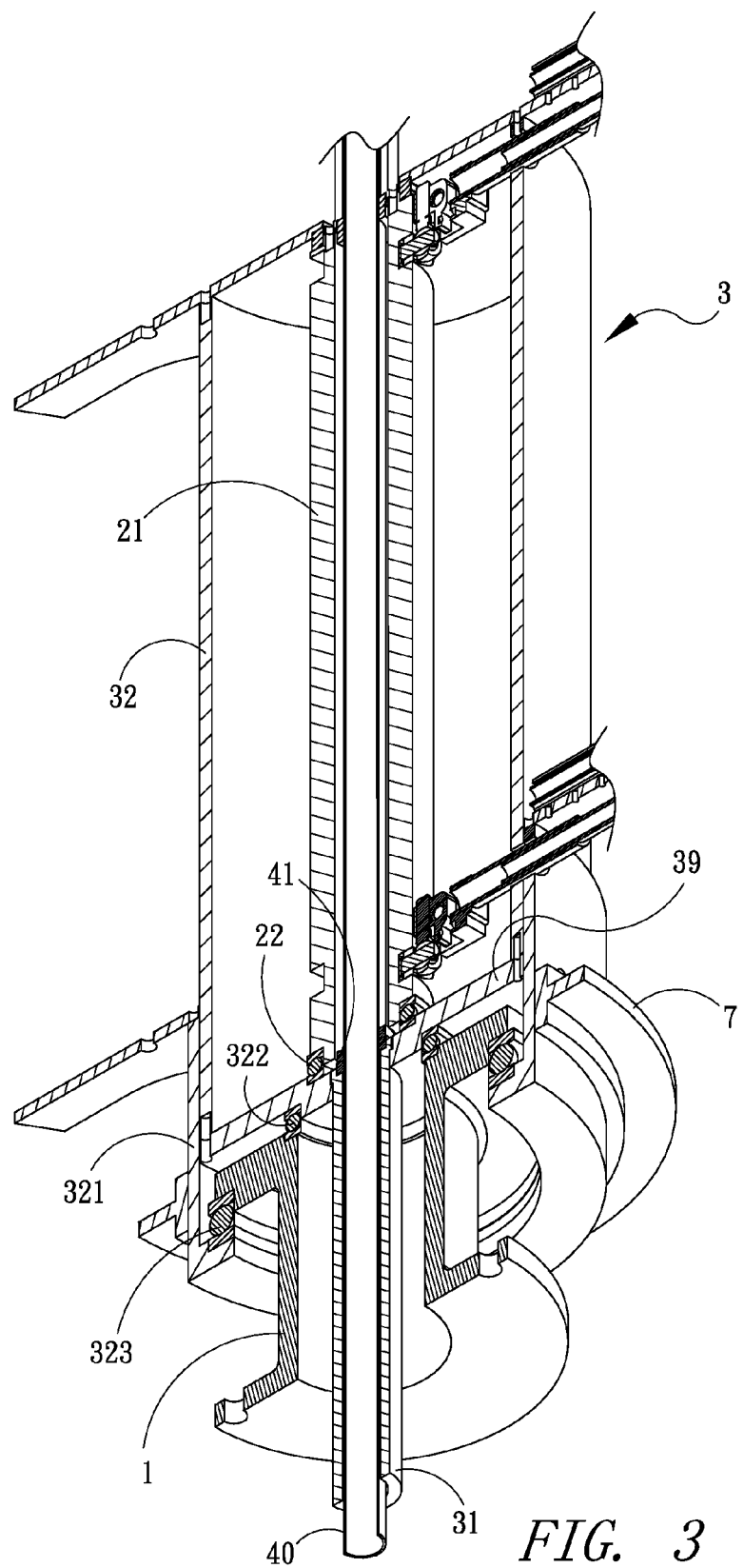
FIG. 3 is a sectional view showing the structure of the tower type vertical axle windmill of the present invention.
Figure 4:
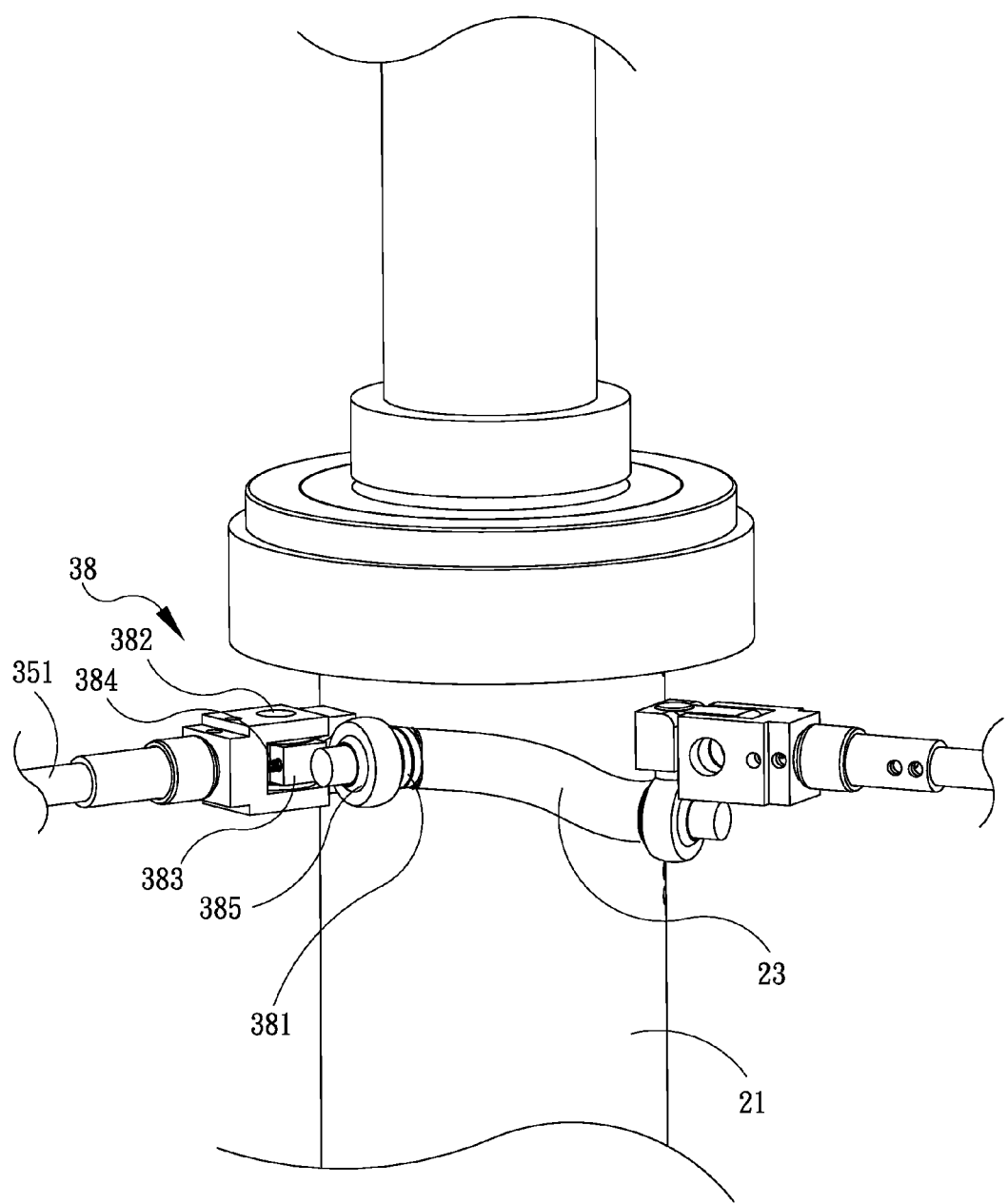
FIG. 4 is an enlarged view of the area of the rotation guiding tube of the tower type vertical axle windmill of the present invention.
Figure 5:
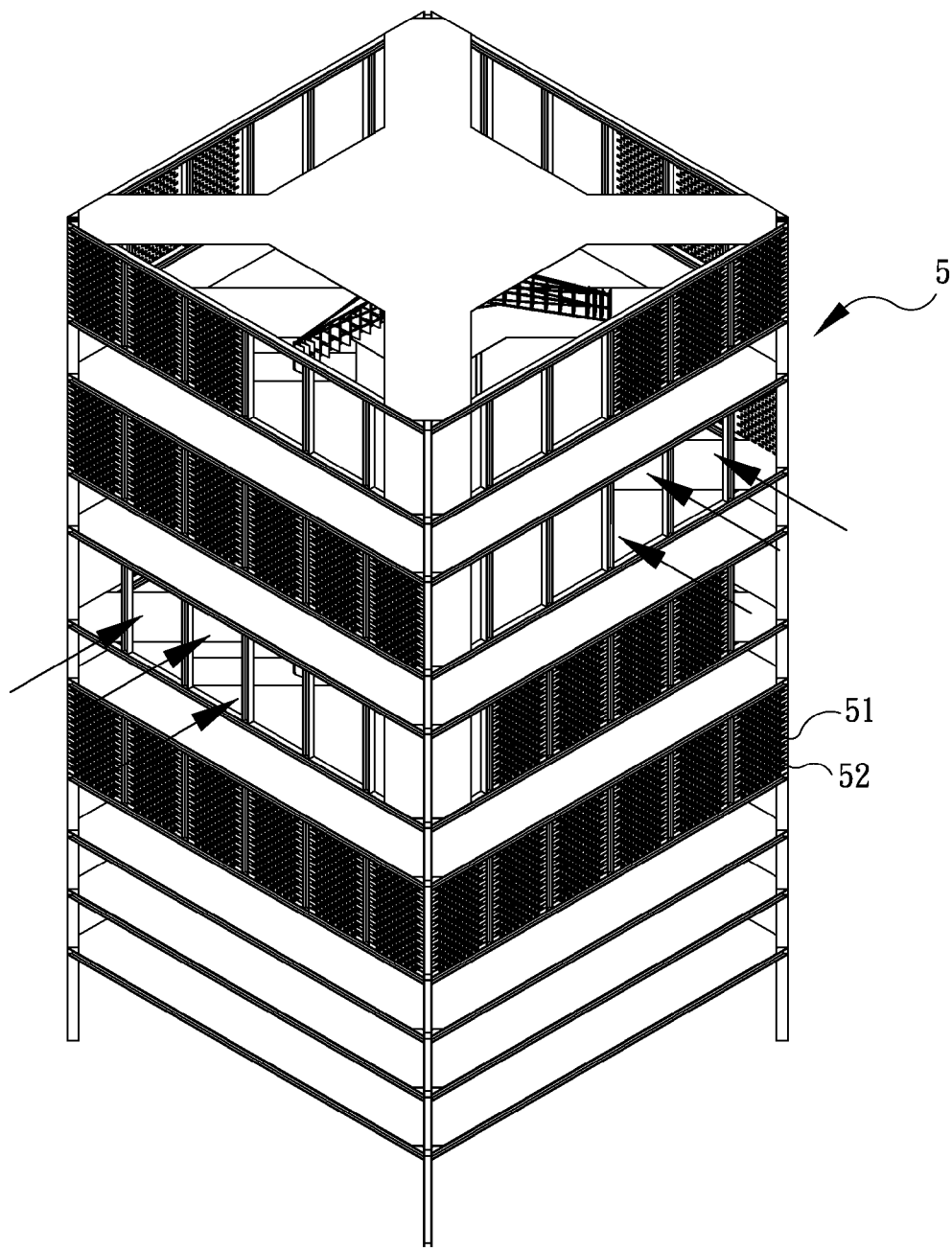
FIG. 5 is a perspective view showing the tower portion of the windmill of the present invention.
Figure 5A:
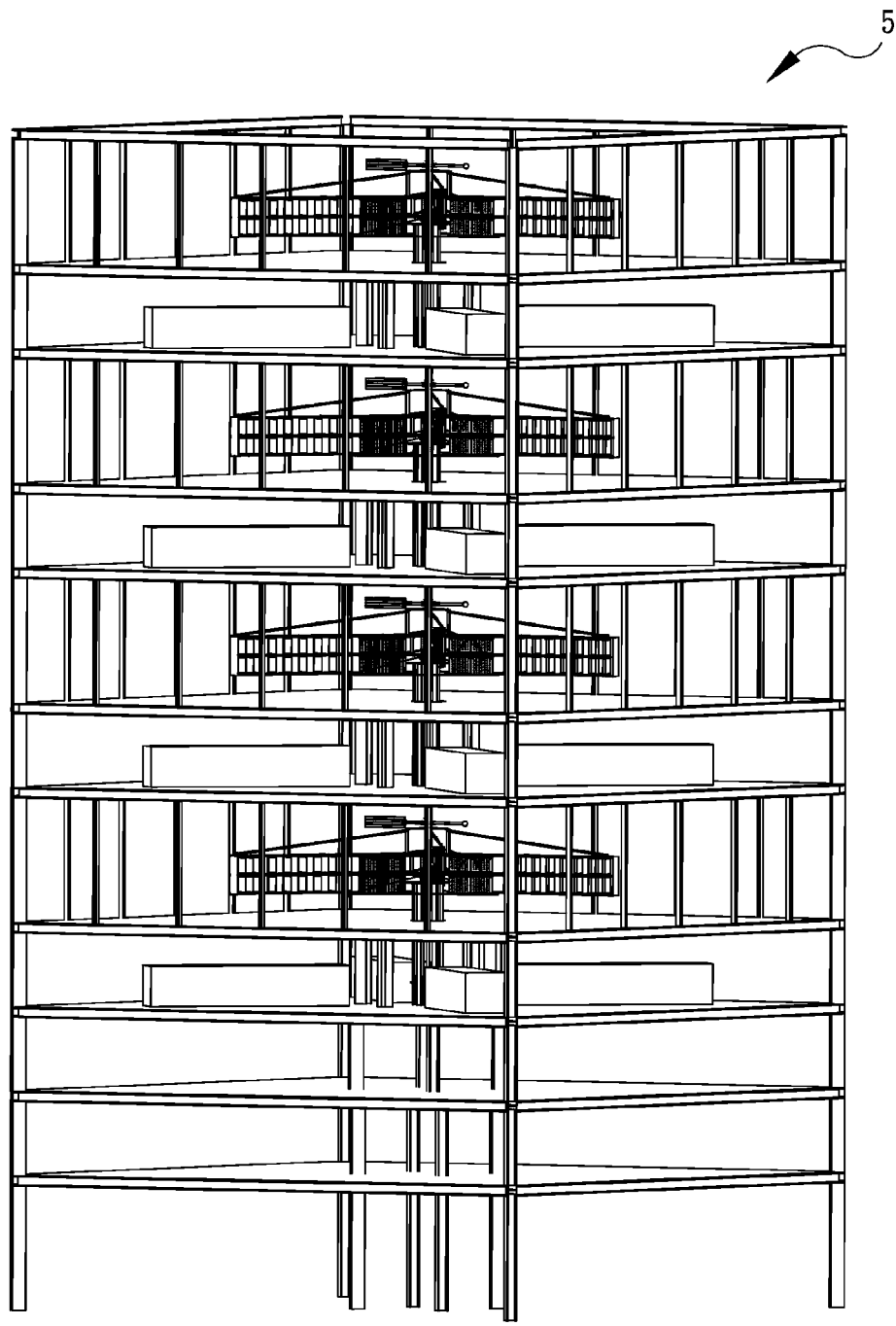
FIG. 5A is a view showing the framework of the tower portion.

Now, please refer to FIG. 3. An extension sleeve 321 is connected with the lower portion of the sleeve 32. The rim of the extension sleeve 321 is folded inwards to snugly hug the bottom portion of the seat portion 1. Bearings are provided between the extension sleeve 321 and the seat portion 1 to enhance the stability of the energy output assembly 3 and to keep rainwater and dusts off to ensure a long service life. A brake disk 7 is provided outside the extension sleeve 321 to stop the operation for maintenance.

Please see FIG. 1 now. Bracing bars 341 and ropes 342 are used to connect the blade modules 34 and connective portions 33 to secure them. The bracing bars 341 and ropes 342 should run across the widest expansion positions of the resistance blades 35 to ensure they can withstand strong winds.

Please see FIG. 6. To reduce the blades' wind resistance, the resistance blades 35, whose angles are adjustable, are fully let down to extract the maximal energy from the wind when facing in the wind direction; the resistance blades 35 are fully lifted upwards to allow the wind to pass the blades when facing against the wind direction. A plurality of holes 352 are provided in each of the resistance blades 35. When the resistance blades 35 are facing in the wind direction, these holes 352 can reduce the wind resistance behind the resistance blades 35.

Figure 6B:
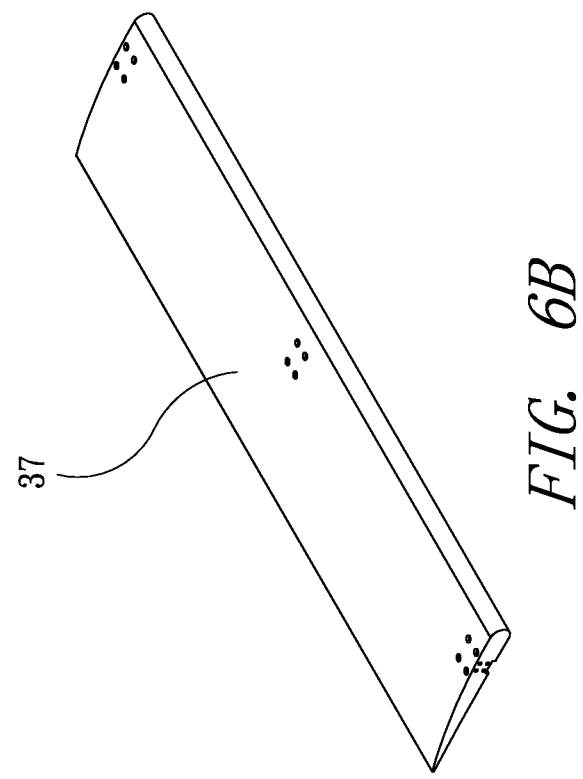
FIG. 6B is a perspective view showing one of the inertia units.
Figure 6A:
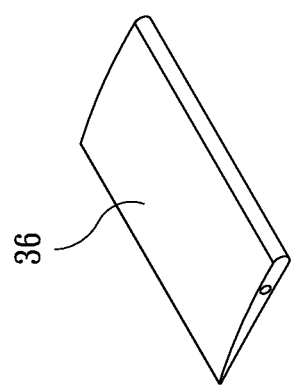
FIG. 6A is a perspective view showing one of the vertical blades.

Please see FIGS. 6A and 6B. To increase the rotational inertia, each of the vertical blades 36 on the outer side has an increased mass to form an inertia unit 37. Each inertia unit 37 and several vertical blades 36 on the outer side jointly form a flywheel 6. Because the total mass is increased and the moment is larger, such design enables the energy output assembly 3 to keep on rotating once it starts to rotate and hence reduce the dependence on the stability of wind.

The cross section of each vertical blade 36 and each inertia unit 37 is similar to that of an airfoil. According to Bernoulli's principle, as the wind passes the vertical blades 36, the energy output assembly 3 would rotate.

Please see FIGS. 4, 7, 7A, 7B and 7C. To maintain good operating angles of the resistance blades 35, the cam 381 must constantly stay within the track guiding portion 23. Because the rotation guiding tube 21 has a circular cross section, the relative distance between the cam and the track guiding portion 23 varies as the cam 381 rotates. Therefore, a clamping wedge unit 383 is used and is connected with the rotational axle 382. The clamping wedge unit 383 is provided with a spring 384. A ball type rotational axle 385 is provided on one end of the clamping wedge unit 383. The cam is disposed on the ball type rotational axle 385.

Figure 7A:
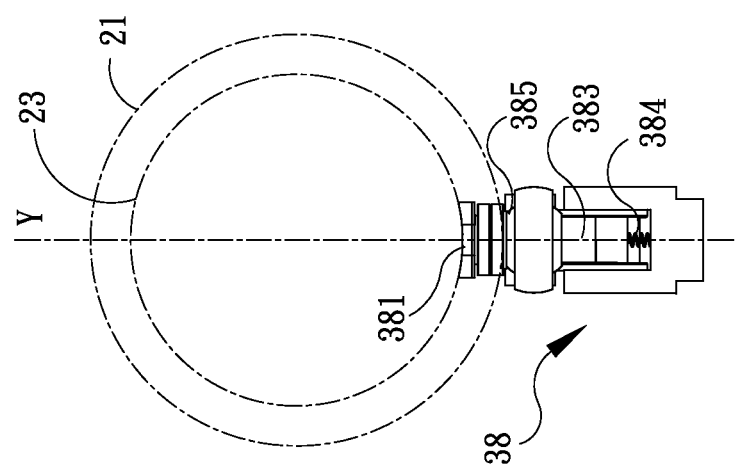
FIG. 7A is a first view showing how the camshaft operates (1).
Figure 7:
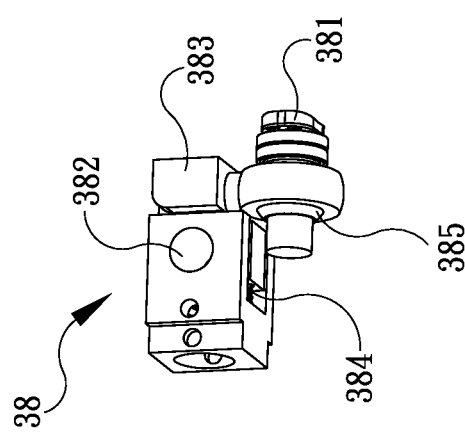
FIG. 7 is a perspective view showing the camshaft.

Initially, the cam 381 would touch the bottom portion of the track guiding portion 23 (FIG. 7A). As the blade assembly 30 rotates, the camshaft 38 would move in the track guiding portion 23 to prompt the cam 381 to move away from the bottom portion of the track guiding portion 23 (FIG. 7B). Now, the spring 384 exerts a force to move the cam 381 in the Z direction through the clamping wedge unit 383 and the ball type rotational axle 385 can keep the cam 381 staying within the track guiding portion 23 (FIG. 7C). Therefore, with such design, the cam 381 can move in the X, Y and Z directions to stay within the track guiding portion 23.

Please see FIG. 8. Instantaneous strong air flows may damage the resistance blades 35. A hinge unit 353 may be provided between the resistance blades 35 and the rotational axle 351. The force needed to open the hinge unit 353 may be set in advance. When a strong air flow exceeds a certain level, leaves 354 of the hinge unit 353 may reduce the strength of the flow.

Figure 9:
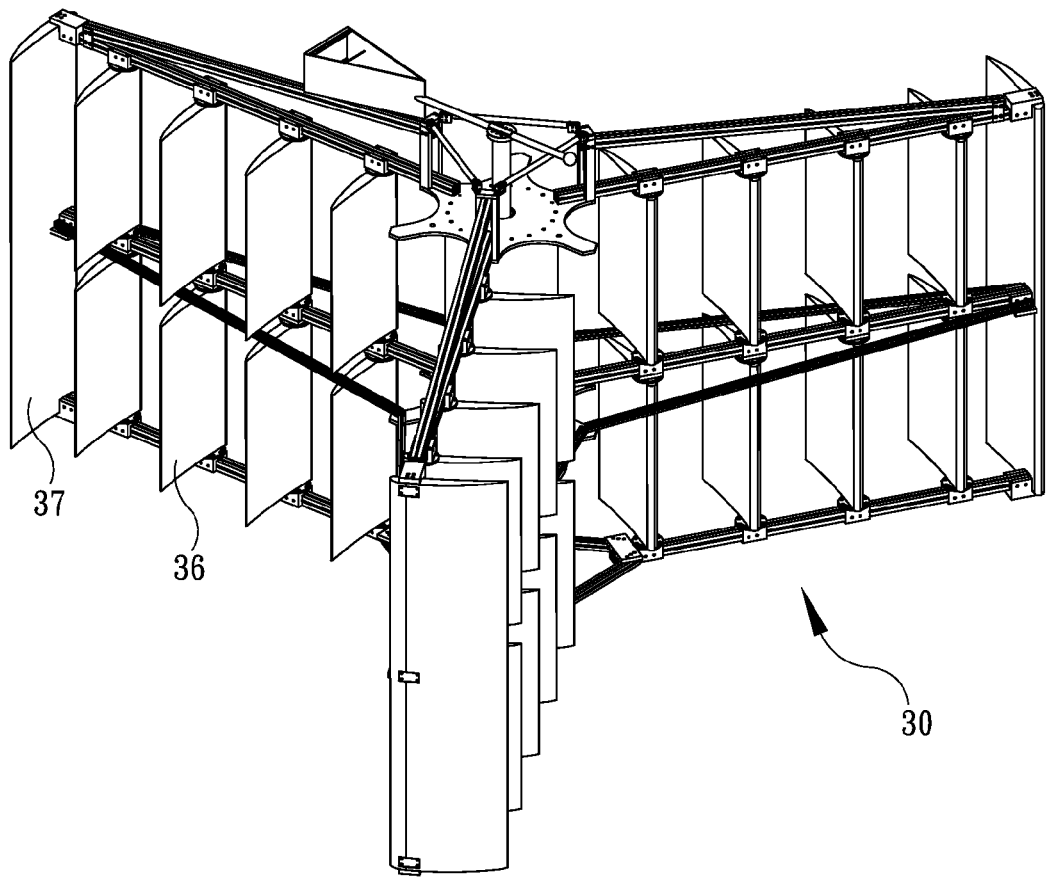
FIG. 9 is a perspective view showing only vertical blades are used.

Now, please refer to FIG. 9. In the actual applications, the blade modules 34 may be modified according to the strength of winds in a certain location. For example, in a place that has weaker winds, more vertical blades 36 may be used so as to extract all the energy contained in the weaker winds. Also, in such case, less resistance blades 35 may be used and the vertical blades 36 may be used to replace all the resistance blades 35. Such approach may simplify the structure.

Figure 10:
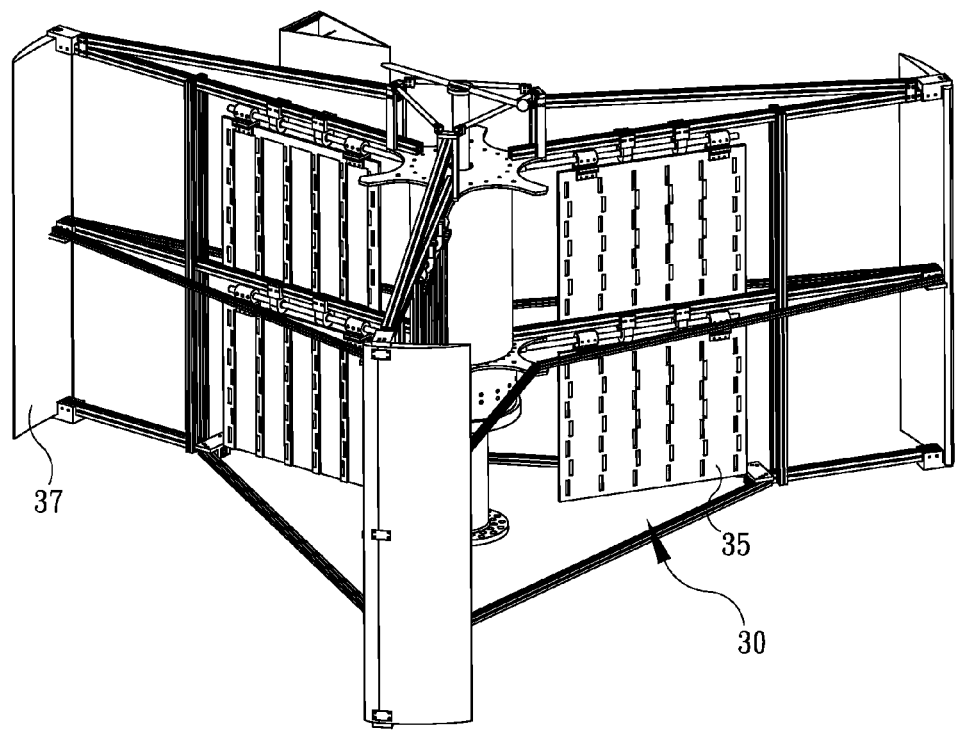
FIG. 10 is a perspective view showing only resistance blades are used.
Figure 11:
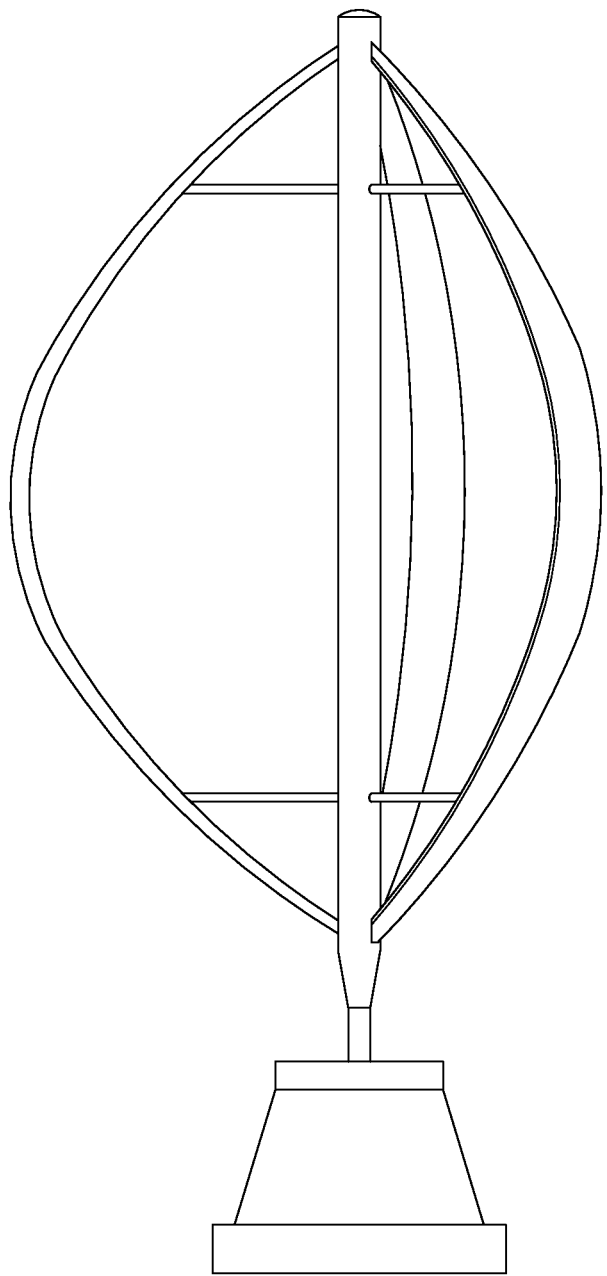
FIG. 11 is a view showing the sail wing type (vertical axle) windmill of the prior art.
Figure 12:
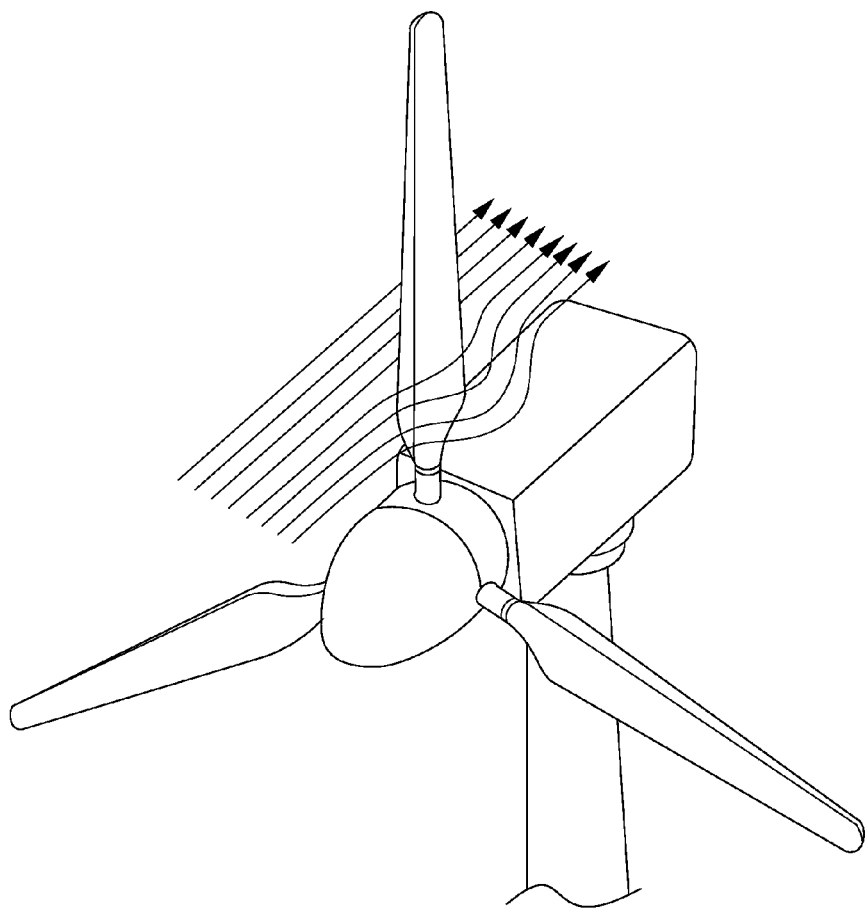
FIG. 12 is a perspective view showing the horizontal axle windmill of the prior art and how the blade shape affects the air flow.
Figure 13:
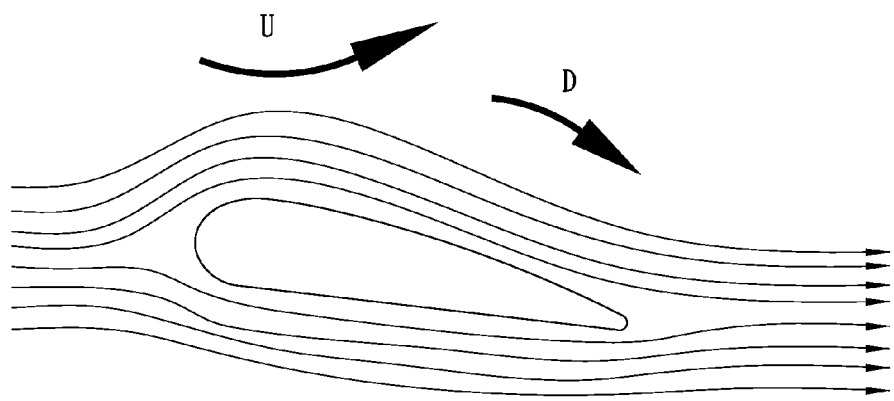
FIG. 13 is a sectional view showing the air flow around one of the blades.
Figure 14:
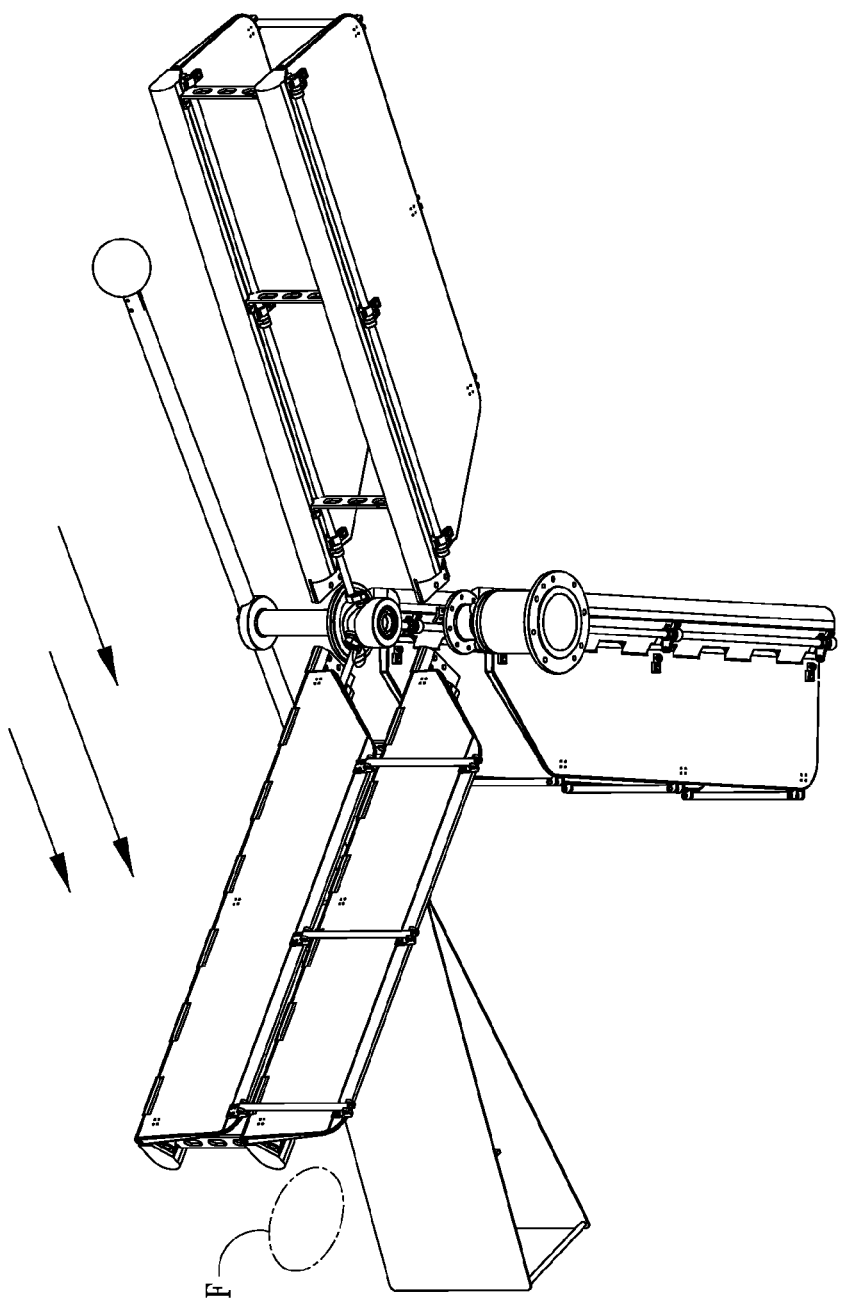
FIG. 14 is a perspective view showing the disadvantages of the sail wing type (vertical axle) windmill of the prior art.

Please see FIG. 10. In a place that has stronger winds, we can increase the amount of the resistance blades 35 and reduce the amount of the vertical blades 36. In addition, in the extreme case, the resistance blades 35 may be used to replace all the vertical blades 36. Such approach may also simplify the structure.

In comparison to the prior art, the tower type vertical axle windmill of the present invention has the following advantages:

1. The tower type vertical axle windmill of the present invention has a tower portion with a plurality of layers and each layer is provided with a wind turbine. Also, walls are provided on each layer and a computer is used to open and close the walls according to the wind directions. Therefore, the windmill of the present invention is structurally simple, lightweight and reliable and has low costs in manufacturing and maintenance.
2. In the tower type vertical axle windmill of the present invention, the blades are constantly perpendicular to the wind direction.
3. The axle can start to rotate when there is only a weak wind and the energy so extracted from the weak wind may be stored in an energy storage unit. As the energy stored in the unit reaches a certain level, power generation may be started. Therefore, the windmill of the present invention has a high efficiency of power generation and a lower cost per degree of power so generated.
4. The windmill of the present invention is lightweight and its structure is strengthened. Therefore, when there is a strong wind, there is no need to stop its operation and, instead, the windmill can still be used to carry out a full load of power generation.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A tower type vertical axle windmill, comprising:
 a tower portion, with a plurality of layers, wherein the tower portion has a plurality of wind turbines and a computer is used to open and close the walls of the tower portion, and wherein each of the wind turbines comprises:
 a seat portion, able to carry other components;
 an energy output assembly, wherein a circular platform is disposed on the seat portion and is supported by bearings to enable it to turn around, and wherein a sleeve is disposed on the circular platform and moves along with the circular platform, and wherein a blade assembly is connected with the sleeve and has an upper connective portion and a lower connective portion, and wherein the upper connective portion is fixed on the upper portion of the sleeve and the lower connective portion is fixed on the lower portion of the sleeve, and wherein either connective portion is connected with a plurality of blade modules and each blade module has a plurality of resistance blades, and wherein a rotational axle is disposed on the inner end of the blade module and a camshaft is disposed at the lower end of the rotational axle, and wherein a cam of the camshaft can move in the X, Y and Z directions to stay within a track guiding portion and can adjust the angle of the resistance blades, and wherein a plurality of vertical blades are disposed on the outer side of the resistance blades and can prompt the assembly to rotate when the wind blows on the vertical blades, and wherein a flywheel is disposed on the outmost portion of the blade module and can store the energy extracted from the wind and enhance the balance of the wind turbine, and wherein an output axle is connected with the circular platform and the output axle is also connected with a generator; and a rudder assembly, having a rotation guiding tube, which is provided on the circular platform, wherein bearings are provided between the rotation guiding tube and the circular platform so that the rotation guiding tube can turn around independently and the track guiding portion is disposed on the outer surface of the rotation guiding tube, and wherein a rudder seat is disposed on the top portion of the rudder assembly and is terminated into a twin vaned tail wing, which is constantly facing against the wind direction to turn the rotation guiding tube and the blade assembly when the wind direction varies, wherein an extension sleeve is connected with the lower portion of the sleeve and the rim of the extension sleeve is folded inwards to be in contact with the seat portion so as to secure the extension sleeve with the seat portion, and wherein a base portion is provided in the extension sleeve and bearings are provided between the extension sleeve and the seat portion so that either the extension sleeve or the seat portion can turn around independently, and wherein the extension sleeve is fixed to the circular platform of the energy output assembly so as to enhance the stability as the energy output assembly rotates.

2. The tower type vertical axle windmill as in claim 1, wherein the twin vaned tail wing comprises two vanes and connective rods that connect the two vanes and an angle forms between the two vanes so as turn the rudder assembly when the wind direction varies.

3. The tower type vertical axle windmill as in claim 1, wherein a plurality of holes are provided in each of the resistance blades to reduce the negative wind pressure on the other side of each resistance blade (forming "flowing water type blades") when the resistance blades are facing in the wind direction.

4. The tower type vertical axle windmill as in claim 1, wherein a hinge unit is provided between the resistance blades and the rotational axle and when a strong wind exceeds a certain level, leaves of the hinge unit reduce the strength and impact of the strong wind on the resistance blades.

5. The tower type vertical axle windmill as in claim 1, wherein the resistance blades and vertical blades are provided in each layer to drive the vertical axle, and wherein walls are provided on each layer and a computer is used to open and close the walls according to the wind directions, and wherein holes are provided in each wall to reduce the wind pressure.

6. The tower type vertical axle windmill as in claim 1, wherein, in a place that has weaker winds, more vertical blades are used and less resistance blades are used.

7. The tower type vertical axle windmill as in claim 1, wherein, to increase the rotational inertia, each of the vertical blades on the outer side has an increased mass to form an inertia unit and each inertia unit and several outer vertical blades jointly form a flywheel, characterized in that, because the total mass is increased and the moment is larger, such design enables the energy output assembly to keep on rotating once it starts to rotate so as to reduce the dependence on the stability of wind and to enhance the balance of the windmill.

8. The tower type vertical axle windmill as in claim 1, further comprising an antenna and instrument panel portion, wherein a tube extends downwards from the antenna and instrument panel portion and is centrally located in the seat portion, energy output assembly and rudder assembly, and wherein bearings are used to separate the tube from the seat portion, rudder assembly and output axle, and wherein, through the tube, electric wires electrically connect the instrument panel portion and the antenna to other components on the ground level.

9. The tower type vertical axle windmill as in claim 1, wherein bearings are provided between the rotation guiding tube and the energy output assembly so that either of them can turn around to face against or track the wind direction.

10. A tower type vertical axle windmill, comprising:

a tower portion, with a plurality of layers, wherein the tower portion has a plurality of wind turbines and a computer is used to open and close the walls of the tower portion, and wherein each of the wind turbines comprises:

a seat portion, able to carry other components;

an energy output assembly, wherein a circular platform is disposed on the seat portion and is supported by bearings to enable it to turn around, and wherein a sleeve is disposed on the circular platform and moves along with the circular platform, and wherein a blade assembly is connected with the sleeve and has an upper connective portion and a lower connective portion, and wherein the upper connective portion is fixed on the upper portion of the sleeve and the lower connective portion is fixed on the lower portion of the sleeve, and wherein either connective portion is connected with a plurality of blade modules and each blade module has a plurality of resistance blades, and wherein a rotational axle is disposed on the inner end of the blade module and a camshaft is disposed at the lower end of the rotational axle, and wherein a cam of the camshaft can move in the X, Y and Z directions to stay within a track guiding portion and can adjust the angle of the resistance blades, and wherein a plurality of vertical blades are disposed on the outer side of the resistance blades and can prompt the assembly to rotate when the wind blows on the vertical blades, and wherein a flywheel is disposed on the outmost portion of the blade module and can store the energy extracted from the wind and enhance the balance of the wind turbine, and wherein an output axle is connected with the circular platform and the output axle is also connected with a generator; and a rudder assembly, having a rotation guiding tube, which is provided on the circular platform, wherein bearings are provided between the rotation guiding tube and the circular platform so that the rotation guiding tube can turn around independently and the track guiding portion is disposed on the outer surface of the rotation guiding tube, and wherein a rudder seat is disposed on the top portion of the rudder assembly and is terminated into a twin vaned tail wing, which is constantly facing against the wind direction to turn the rotation guiding tube and the blade assembly when the wind direction varies, wherein a clamping wedge unit is used and is connected with the rotational axle, and wherein the clamping wedge unit is provided with a spring and a ball type rotational axle is provided on one end of the clamping wedge unit, and wherein the cam is disposed on the ball type rotational axle, characterized in that the cam can move in the X, Y and Z directions to stay within the track guiding portion.

11. The tower type vertical axle windmill as in claim 10, wherein the twin vaned tail wing comprises two vanes and connective rods that connect the two vanes and an angle forms between the two vanes so as turn the rudder assembly when the wind direction varies.

12. The tower type vertical axle windmill as in claim 10, wherein a plurality of holes are provided in each of the resistance blades to reduce the negative wind pressure on the other side of each resistance blade (forming "flowing water type blades") when the resistance blades are facing in the wind direction.

13. The tower type vertical axle windmill as in claim 10, wherein a hinge unit is provided between the resistance blades and the rotational axle and when a strong wind exceeds a certain level, leaves of the hinge unit reduce the strength and impact of the strong wind on the resistance blades.

14. The tower type vertical axle windmill as in claim 10, wherein the resistance blades and vertical blades are provided in each layer to drive the vertical axle, and wherein walls are provided on each layer and a computer is used to open and close the walls according to the wind directions, and wherein holes are provided in each wall to reduce the wind pressure.

15. The tower type vertical axle windmill as in claim 10, wherein, in a place that has weaker winds, more vertical blades are used and less resistance blades are used.

16. The tower type vertical axle windmill as in claim 10, wherein, to increase the rotational inertia, each of the vertical blades on the outer side has an increased mass to form an inertia unit and each inertia unit and several outer vertical blades jointly form a flywheel, characterized in that, because the total mass is increased and the moment is larger, such design enables the energy output assembly to keep on rotating once it starts to rotate so as to reduce the dependence on the stability of wind and to enhance the balance of the windmill.

17. The tower type vertical axle windmill as in claim 10, further comprising an antenna and instrument panel portion, wherein a tube extends downwards from the antenna and instrument panel portion and is centrally located in the seat portion, energy output assembly and rudder assembly, and wherein bearings are used to separate the tube from the seat portion, rudder assembly and output axle, and wherein, through the tube, electric wires electrically connect the instrument panel portion and the antenna to other components on the ground level.

18. The tower type vertical axle windmill as in claim 10, wherein bearings are provided between the rotation guiding tube and the energy output assembly so that either of them can turn around to face against or track the wind direction.

\* \* \* \* \*